(12) United States Patent
Beck

(10) Patent No.: US 9,754,264 B2
(45) Date of Patent: Sep. 5, 2017

(54) COMMUNICATION SYSTEM AND METHOD FOR ENABLING IMPROVED USE OF AN ELECTRIC APPLIANCE

(71) Applicant: Wilfried Beck, Wiesbaden (DE)

(72) Inventor: Wilfried Beck, Wiesbaden (DE)

( * ) Notice: Subject to any disclaimer, the term of this patent is extended or adjusted under 35 U.S.C. 154(b) by 0 days.

(21) Appl. No.: 15/430,685

(22) Filed: Feb. 13, 2017

(65) Prior Publication Data
US 2017/0200168 A1 Jul. 13, 2017

Related U.S. Application Data

(63) Continuation of application No. 11/293,530, filed on Dec. 2, 2005, now abandoned, which is a continuation of application No. PCT/EP2004/005228, filed on May 14, 2004.

(30) Foreign Application Priority Data

May 14, 2003 (EP) .................................. 03010802

(51) Int. Cl.
| | |
|---|---|
| *H04L 29/06* | (2006.01) |
| *G06Q 30/00* | (2012.01) |
| *H04L 12/28* | (2006.01) |
| *H04M 3/51* | (2006.01) |

(52) U.S. Cl.
CPC ....... *G06Q 30/016* (2013.01); *H04L 12/2827* (2013.01); *H04L 12/2834* (2013.01); *H04M 3/5191* (2013.01)

(58) Field of Classification Search
CPC .............. G06Q 30/016; H04L 12/2827; H04L 12/2834; H04L 3/5191
See application file for complete search history.

(56) References Cited

U.S. PATENT DOCUMENTS

| | | | |
|---|---|---|---|
| 7,190,782 B2* | 3/2007 | McGraw | A61K 38/40 379/265.03 |
| 7,200,639 B1* | 4/2007 | Yoshida | G06F 3/0482 703/13 |
| 2002/0013723 A1* | 1/2002 | Mise | G06Q 20/401 705/304 |
| 2003/0078990 A1* | 4/2003 | Lee | H04B 3/546 709/218 |
| 2004/0049562 A1* | 3/2004 | Kikinis | H04L 29/12047 709/220 |
| 2005/0249169 A1* | 11/2005 | Fong | H04L 12/2803 370/338 |

* cited by examiner

*Primary Examiner* — Abdelnabi O Musa
(74) *Attorney, Agent, or Firm* — The Webb Law Firm

(57) ABSTRACT

A communication system comprising at least one electric appliance (2, 17, 18, 19, 20) and a server (1, 21). The appliance (2, 17, 18, 19, 20) is linked to the server (1, 21), relevant data of the appliance (2, 17, 18, 19, 20) is reproduced in the server (1, 21) and the latter can be connected to a call center (5) via the Internet. When a request is made, the call center can access the server (1, 21) or the appliance (2, 17, 18, 19, 20) and the desired appliance (2, 17, 18, 19, 20) function or status can be achieved by the remote action of the center.

10 Claims, 5 Drawing Sheets

COMMUNICATION SYSTEM AND METHOD FOR ENABLING IMPROVED USE OF AN ELECTRIC APPLIANCE

RELATED APPLICATIONS

This application is a continuation of U.S. patent application Ser. No. 11/293,530, filed Dec. 2, 2005, which is a continuation of International Application No. PCT/EP2004/005228, filed May 14, 2004, which claims the benefit of European Patent Application No. EP 03010802.1, filed May 14, 2003, all of which are incorporated herein by reference.

The instant application should be granted the priority date of Dec. 3, 2004, the filing date of the corresponding German patent application 10 2004 058 350.1.

BACKGROUND OF THE INVENTION

Computer technology enables equipping electrical appliances in such a way that they show various functions, consequently providing a broad benefit for the user.

Usually the user will not be able to use said various applications, because herefor a complex comprehension of the appliance would be necessary. Due to the fact that the respective applications are used rather poorly, the user is not aware of it. User manuals are often very hard to understand so that the user relinquishes using a plurality of the applications of his appliance.

Particularly the user often cannot understand the automation-technologies of the appliances, in his own house, intended by the industry, not even to mention about operating said appliances properly. On the account of the customer and following various approaches, a dispute is carried out, among the manufacturers about the best ergonomics, which can result in the refusal of the technology. Such an increase of "technique-frustration" and the high costs of some exclusive automation solutions are furthermore responsible for a remarkable delay considering realizing them. Independent to that, periodical support- and service costs have to be sold by each manufacturer to the customer which quickly generates refusal, particularly in private households.

DE 100 56 490 A1 shows a method and a device for providing manuals for domestic appliances. To enable an improved supply of customers with manuals for domestic appliances, it is suggested that the message to request an up to date manual can be sent to a service provider by a domestic appliance, connected to a distributed network, and that said manual is received by the domestic appliance at its position in the network via the distributed network. The user of the appliance, herewith receives an up to date manual, which precisely fits to his appliance, only in the case of requesting it concretely. This still comprises the disadvantage described before, that the user cumbersomely has to deal with the manual. A highly skilled technical understanding to follow the manual might be necessary, which not every user has.

The DE 100 56 491 A1 shows a method and a device to improve the maintenance and the service of a domestic appliance. It is proposed that a message to request the service- and/or maintenance staff can be sent from a domestic appliance, connected to the network, to an authorized service provider.

Hereby it is not necessary any more that the user of the appliance would have to consult any brochures or directories of telephone numbers, because for the service, the first thing to contact is the domestic appliance itself. A remote diagnosis of said domestic appliance can be initiated from a service point or an authorized customer service via the network. Herewith all questions to the customer about the character of a malfunction disappear and the customer service can be briefed optionally and individually for the work to be done.

When a customer service is briefed, items not in stock still can be ordered urgently from the manufacturer.

It is an object of the invention to create a communication system and a method for an improved benefit of an electrical appliance, which enables the user of the appliance to receive competent assistance, considering the disposition of the appliance.

SUMMARY OF THE INVENTION

The invention proposes a communication system comprising at least one electrical appliance, a server, whereby the appliance is linked to the server, the server reproduces relevant data of the appliance, the server being connectable with a Call-Center via the Internet.

The Call-Center can also operate following the intranet-principle as a closed system, providing a connection to the concierge of a hotel or a family member in the office for instance. The owner of the technical appliance has the access to said data on the server, i.e. the customer.

According to the invention, the communication system is characterized by the feature, that the Call-Center has access to the data of his electrical appliances, respectively to the data up to date, exclusively at the moment the user precisely intends.

This means that the data are not stored at a third person which might archive them there. This might have the disadvantage that the data said third person has, would have to be archived and cared for and might not be usable anymore, if for instance a data protection act might change interdicting the use of data by the service provider. According to the spirit of the invention said third person has access to the up to date data of the appliance, after the user has requested a connection to the Call-Center, hereby allowing access also to said third person. In the case the user interrupts the connection to the Call-Center, the Call-Center has no more access to the data.

It is essential for the communication system according to the invention that not only the user has access to the electrical appliance instantaneously and can use it in the intended way comprising all the features provided, but that also an external, competent third person, at hand of the Internet-Call-Center, also gets access to the appliance respectively gets access to the appliance via the server. If the user of the appliance feels overburdened by a feature, he does not have to look up in service manuals cumbersomely, but only has to connect the Internet-Call-Center.

Hereby he receives competent assistance, whereby the competent employee indicates which operational steps the user has to undertake, in order to achieve the aim he desired, alternatively the competent employee in the Internet-Call-Center himself effectuates said steps instantaneously after receiving access to the server, respectively to the appliance.

In the last case the user just has to indicate his intentions to the Internet-Call-Center, which are then fulfilled by it.

By this dislocation of activities to be proceeded to the Internet-Call-Center, complex operations can be carried out, without introduction, i.e. without having to use the manual, respectively functions like music and ordering music, Email, alarm home automation, reminder of time, to wake up for instance, medical alarms etc.

This is possible throughout the whole home automation. By this communication system, the user will be motivated emotionally to install a home-network. Maintenance- and service costs for the network and its operation will then be added to this daily used environment and hereby accepted more easily by the user.

The communication system according to the invention is characterized in that the server is connected with the Call-Center via Internet upon request of the user. The Internet-Call-Center then has access to the server and/or appliance via the Internet. The electrical appliance linked to the server can be of all kind of electrical appliance, also comprising movable electrical appliances. This means that also mobile telephones or electrical appliances in a vehicle particularly in a car are comprised for instance. Said communication system also enables the user to receive competent assistance considering the use of said electrical appliances. Hereby the server can also be part of the appliance itself. The server can also be located anywhere in the Internet. It is also possible, that the server function is affixable, for instance affixable directly upon said appliance. Hereby it is possible, that said server can be affixed, instead of a barcode. The term "Call-Center" is to be understood widely. Contact to the Call-Center can be set up by a person or an automatic voice machine.

In this context, it is possible, that the first contact to the Internet-Call-Center can be set up with the automatic voice machine of the Call-Center and only in the case if the automatic voice machine is not able to provide the requested assistance, instead of the robot-voice a human person communicates.

In the most simple embodiment, the server is a black-box-server. Various appliances can be connected with it.

Taking a hi-fi unit for instance, each room for example has allocated room displays, particularly comprising loudspeakers, indication-means and input-keyboards. A button is provided particularly to set up the connection between server and Internet-Call-Center upon request of the user. This button hereby has the function of a "help-button". Via loudspeaker, which usually serves for playing music, and via microphone, the communication with the Internet-Call-Center can be arranged, after actuating the "help-button". In the case that settings have to be made at the room-display, they can be made by input-buttons alternatively, upon briefing by the Internet-Call-Center, if said settings are not made by the Internet-Call-Center itself. The black-box-server is connected to the Internet via a modem for instance. The Internet-Call-Center can be located at any place in the world.

Actuating the help-button, the manual and display and an input keyboard of the appliance to be operated will be provided to the service provider via the Internet. The user can speak to him freely; the service provider can actuate the appliance for him.

It is regarded as very advantageous, if the help-button interacts with an identification system. Hereby it identifies for instance the fingerprint or the voice of an authorized user. Only in the case that the identification system identifies the authorized person, the help-button will be activated.

The communication system is extendable, if the black-box-server is not only connected to one or more room-displays, but also with a PC, having its own software, or wireless, by wireless LAN (WiFi) or with a laptop with WiFi or PDA with WiFi. Using a PC the room display will be transferred upon its screen, respectively when using a laptop.

The communication system is even more extendable if the server is not designed as a black-box-server, but as an open platform. Such an open computer compared to a black-box has the advantage, that it can be manipulated, such that it can be reworked according to the concrete request.

As described before, the invention is not limited to a communication system, in connection with a hi-fi-unit, particularly to a multiroom-hi-fi-unit on IT-basis for modern home automation. Every electrical appliance can be taken, for instance a control of home automation or medical monitor appliances.

The invention further proposes a method for improving the benefit of an electrical appliance, whereby relevant data of the appliance are made available to the Internet-Call-Center by a server, such that a desired status of the appliances is effected by external activity of the Internet-Call-Center.

This desired status of the appliance can be realized by an instantaneous access of the Internet-Call-Center to the server and/or the appliance, or by the user of the appliance himself, who receives the information needed from the Internet-Call-Center to realize an improved benefit of the electrical appliance.

The Internet-Call-Center and the user preferably communicate verbally, although it is also possible, that the information is transmitted as type face or exclusively by pictures or data.

According to the invention it is not necessary that finding contact has to be realized by a button which provides the function of a "help-button". The connection can be set up anyhow, for instance on a screen, by a mouse click, or by pushing a button. It is also possible, that the contact to the Internet is set up via IP (Internet protocol) by pushing a button or the like automatically. Under the aspect of home automation this connection is set up by itself, for instance in the case that the heating installation indicates an error, for example in the case that a critical temperature is exceeded by the heating installation. This information will be provided to the Internet-Call-Center, which then interacts with the appliance or warns a further person. A further preferred field of realization is fire alarm, by linking the electrical fire detector with the Internet-Call-Center. Hereby a communication system is provided, which, in the case of certain circumstances of the electrical appliance, initiates an automatic reaction by the Help of the server and by the Help of the Call-Center with external activity of the Call-Center.

Further aspects of the invention are disclosed in the subclaims, the description of the Figures, the Figures themselves, whereby all features and combinations of features are not to be interpreted in a limiting way.

BRIEF DESCRIPTION OF THE DRAWINGS

The Figures show the invention for a multiroom hi-fi unit on IT-basis by several embodiments, shown for a modern home automation, without being limited to that example.

DESCRIPTION OF SPECIFIC EMBODIMENTS

Figure 1:
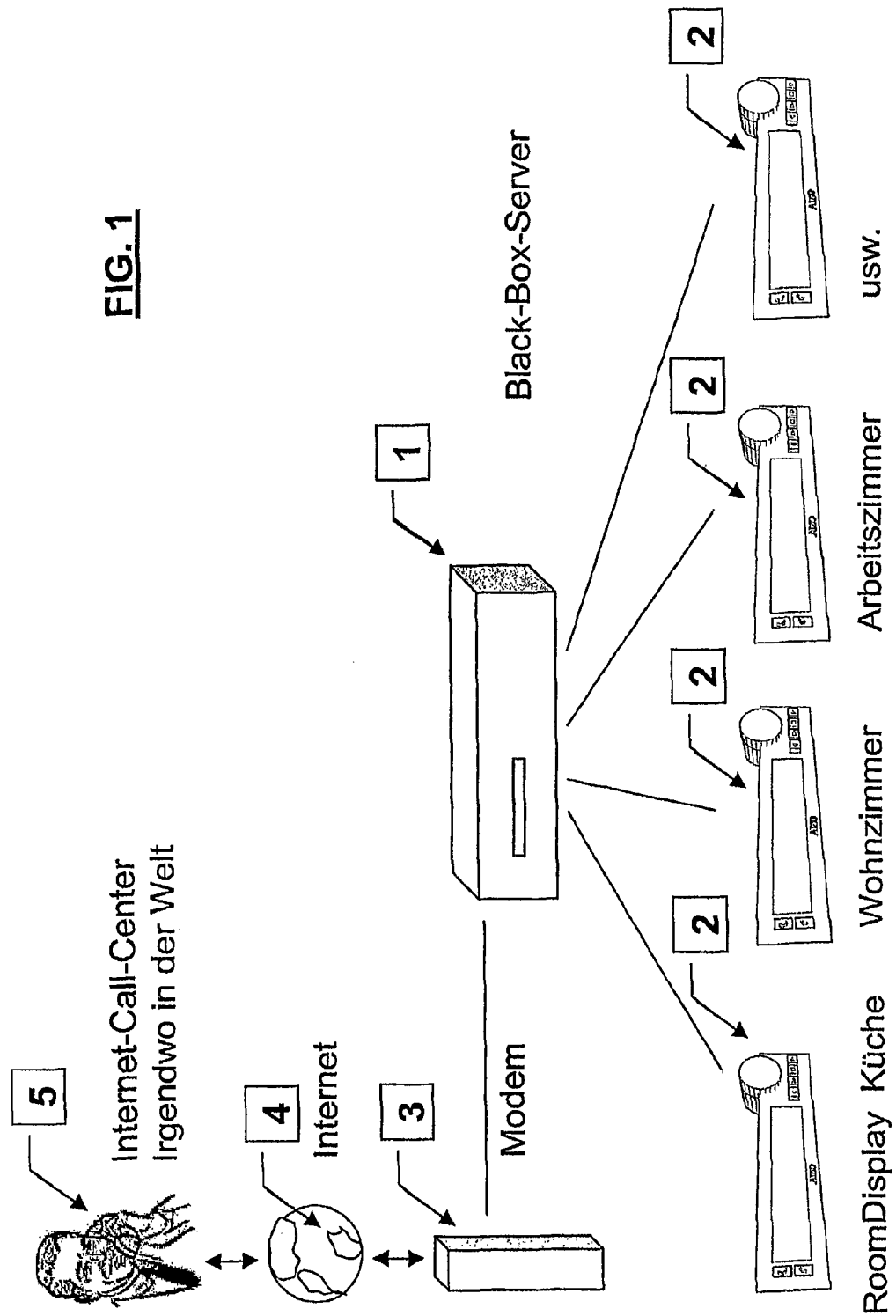
FIG. 1 shows a very simple embodiment of the communication system according to the invention, using a black-box-server.

The communication system according to FIG. 1 shows a black-box-server 1, connected with room displays 2, which are particularly located in the kitchen, the living room, or an office room of the house.

The black-box-server 1 is connected with a modem 3 which is connected to an Internet-Call-Center 5, located anywhere in the world, via Internet 4.

Figure 2:
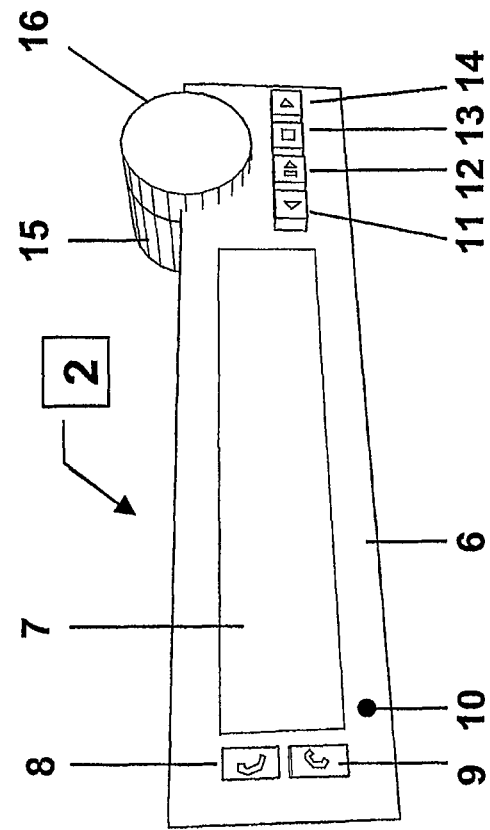
FIG. 2 shows a description of the room display shown in FIG. 1.

FIG. 2 shows the layout of the respective room-displays 2: a graphic-display 7 is integrated in a housing 6. The housing 6 further is provided with a help-button 8, a button 9 for terminating the conversation, and a microphone 10. For playing music, a button 11 comprising a "back" function, a button 12, comprising a "play-hold" function, a button, 13 comprising a "stop" function, a button 14, comprising a "forward" function are integrated in the housing 6. There are furthermore integrated a loudspeaker 15 and a volume- and selection button 16.

Basical functions of the room display are for instance:
Multi-room hi-fi-unit, and jukebox with a user defined amount of compact disks, selectable by artist, album, genre, title, most favored songs by play-lists,
Party-function, to play the same music in all rooms,
Compact design, having a front-layout like a car radio, but also flat like a painting,
Internet radio, with access to thousands of radio stations all over the world,
Built in micro-loudspeaker and,
Connection to the hi-fi system.
Special functions of the room displays are particularly:
Help-buttons of the built-in type to connect with the Internet-Call-Center 5,
Remote control with further functions,
Built in Internet-atomic clock with a wake-up function,
Prepared for Internet-telephoning,
Temperature-, humidity- and light sensors,
Power supply by data wire.
Possible options of the room display are for instance:
Connection for earphones
Close-up radio communication like Bluetooth for PDA, laptop, headset, medical technology
Radio communication for radio loudspeakers
Controlling the light by room display and remote control
E-home control by room display, remote control or PDA,
Docking station or sync-station for cell phone
Receiving PDA-s-mails or reading them
Voice-control of MS-Outlook.

According to the help-button 8, the following scenario might occur:

The user of the appliance (2, 17, 18, 19, 20) or room display actuates the help-button:

Activating the help-button 8 initiates a call at the Internet-Call-Center 5 without instantaneously causing telephone charges because it is realized by free speaking via Internet; and furthermore does not need an identification for the basic function, because identification is made by "room-display".

The Internet-Call-Center 5 for instance responds: "Hello, house of family . . . how can I help you?"

The family in the house is responding: "I would like to play a Madonna song and I do not know how to manage it".

The answer of the Internet-Call-Center 5 might be for instance: "shall I search and start Madonna for you, or should I assist you step by step?"

This is possible, because the displays 2 are reproduced completely in the black-box-server 1 and in the Internet-Call-Center 5 the screen and the display can be observed and operated simultaneously.

Hereby, services connected to the server 1 can be used by the Internet-Call-Center 5 very easily.

Figure 3:
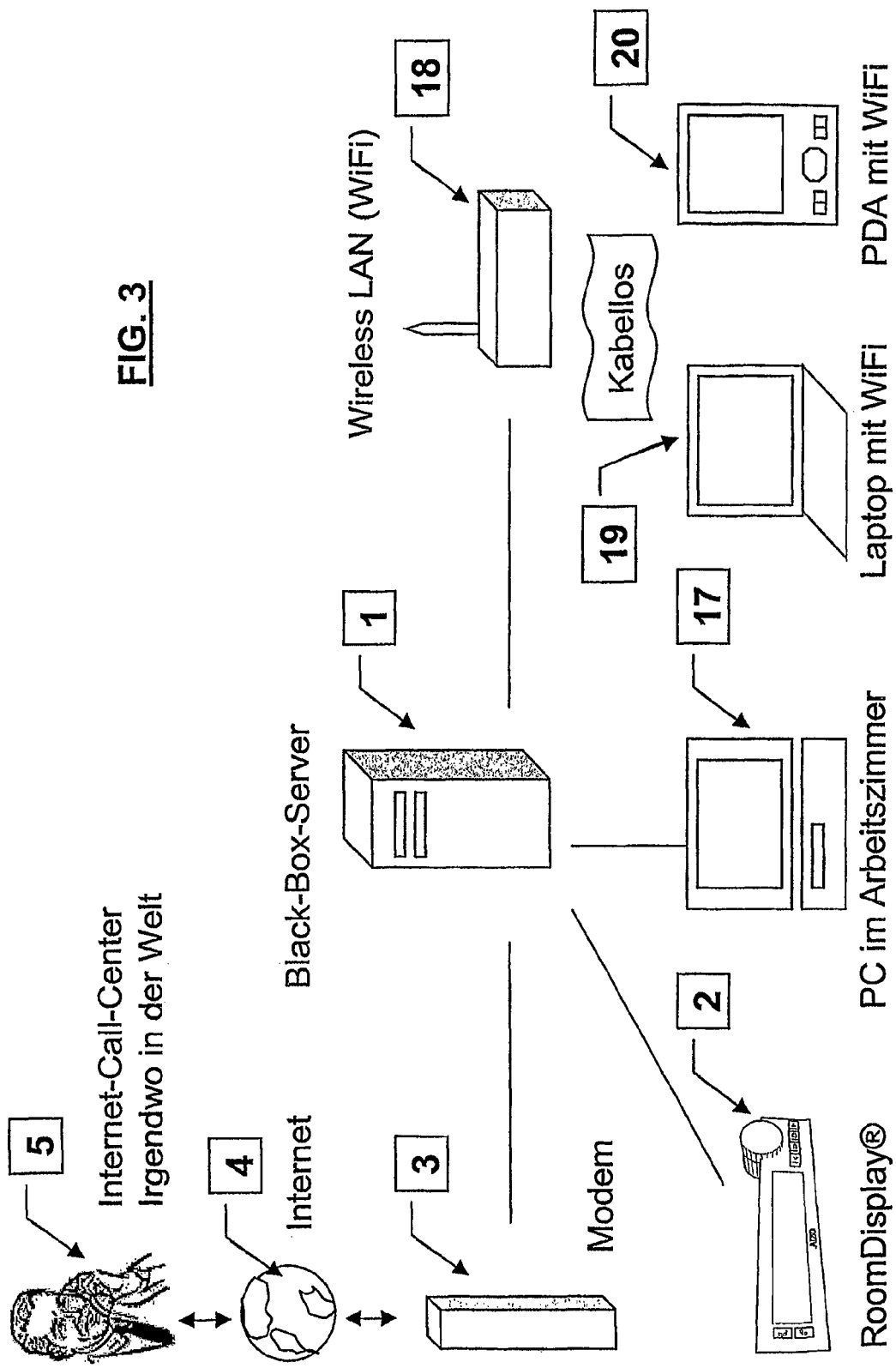
FIG. 3 shows an extended communication system, compared with FIG. 1, but still using a black-box-server.

The embodiment according to FIG. 3 shows that not only one or more room displays can be connected to the black server 1, but also a PC 17, for instance in the office-room and without wire, a wireless LHN (WiFi) 18, and a laptop with WiFi 19, and a PDA with WiFi 20.

Figure 4:
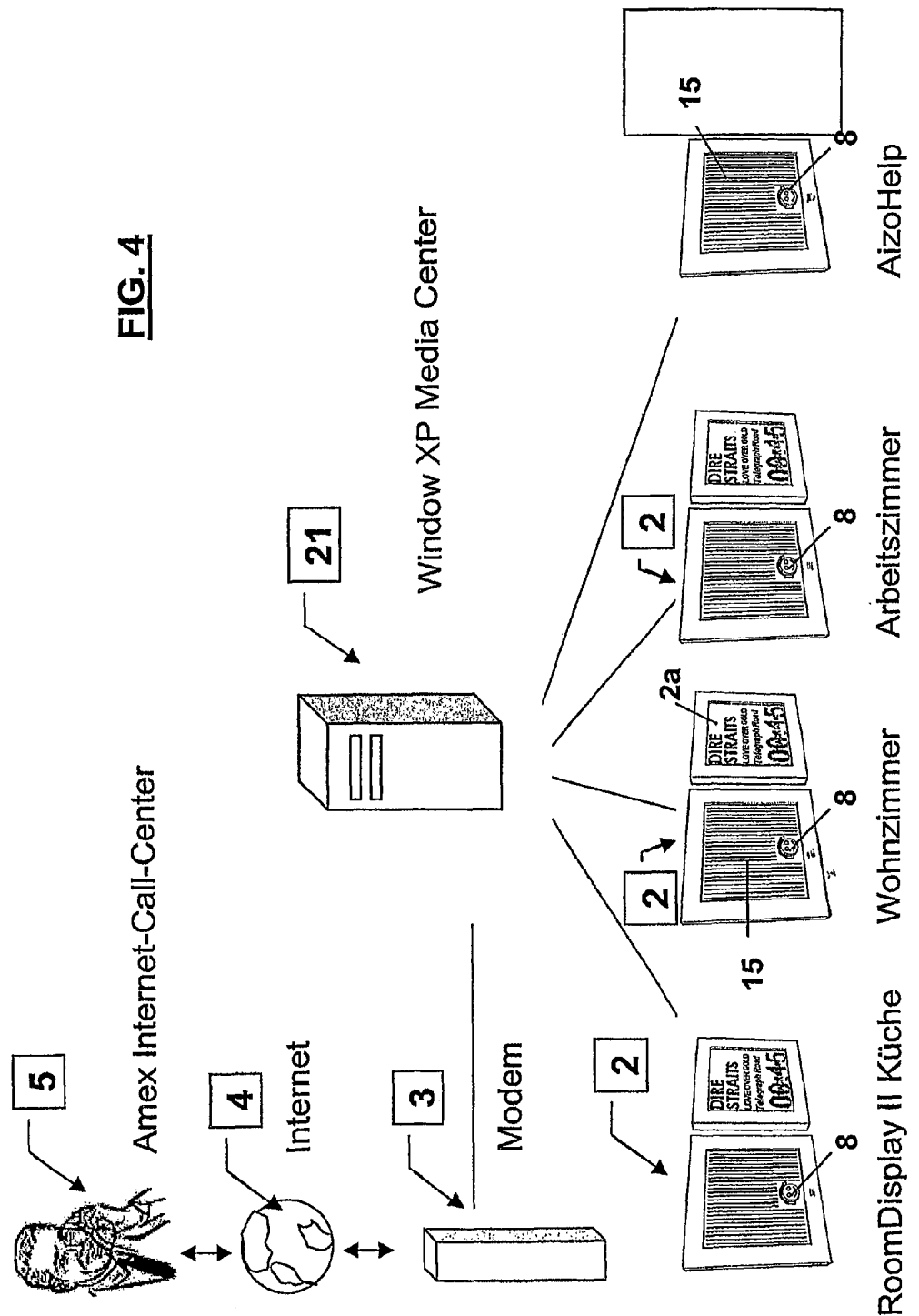
FIG. 4 shows an extended communication system, compared with FIGS. 1 and 3, using an open computer.

Replacing the black-box-server 1, the embodiment according to FIG. 4 shows an open computer 21, connected to the Internet-Call-Center 5 via Internet 4 and modem 3, provided for instance with a Windows-XP Media center. The computer 21 is connected with variously shaped room displays, which are located for instance in the kitchen, the living room, and the office room, each having a help-button 8. For each room display 2 the respective display 2a is emphasized, such as the loud speaker 15 comprising its integrated help-button 8. By actuating said button 8 the contact with the Internet-Call-Center 5 can be set up, in the way explained above. On the right side, of FIG. 4, a modification is shown, compared with room display 2, showing in this Figure, that the respective display 2a was set aside, hereby just providing the loudspeaker 15 with the help-button 8.

Figure 5:
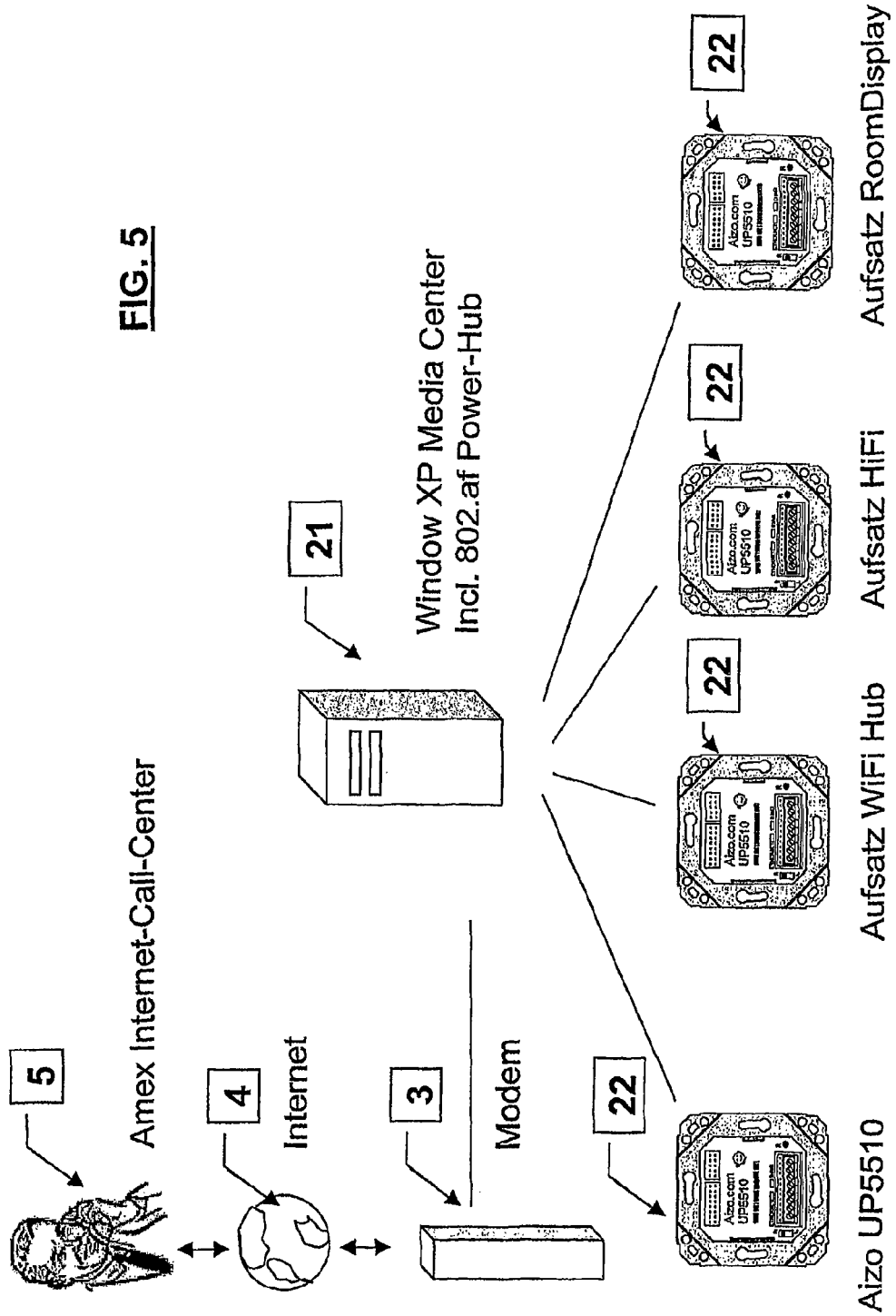
FIG. 5 shows a communication system according to FIG. 4 with a basic module for connecting various appliances.

The embodiment according to FIG. 5 shows the same connection of the computer 21 to the Internet-Call-Center 5 as shown in FIG. 4. The difference to the embodiment according to FIG. 4 is, that FIG. 5 shows the connection of the computer 21 to flush-mounted basic-module sockets, known from the state of the art, showing connections and particularly the options one can imagine for the functions described above. Various displays for instance can be mounted upon said flush-mounted sockets 22.

According to a further embodiment of the invention a help-button 8 can also be provided in a remote control, to control the help-button 8, to set up the connection to the Internet-Call-Center 5 in order to enable then even telephone calls by remote control intervention.

The communication system according to the invention comprises: at least one electrical appliance 2, 17, 18, 19, 20, a server 1, 21, whereby the appliance 2, 17, 18, 19, 20 is linked with the server 1, 21, relevant data of the appliance 2, 17, 18, 19, 20 are reproduced on the server 1, 21, the server 1, 21, is connectable with a Call-Center 5 via the Internet 4.

A preferred embodiment further comprises a server 1, 21, provided as a black-box-server 1, particularly as an open platform 1, 21.

A further preferred embodiment further comprises a plurality of appliances 2, 17, 18, 19, 20 assigned to the server 1, 21.

A still further preferred embodiment further comprises an appliance 2, 17, 18, 19, 20 that is a hi-fi-unit 2, for instance a multiroom-hi-fi-unit 2 with a video server, and/or a home automation appliance 2, 17, 18, 19, 20, for instance a control unit of an edificial heating installation, and/or a medical appliance 2, 17, 18, 19, 20, for instance a medical monitor appliance 2, 17, 18, 19, 20.

Another still further preferred embodiment further comprises an appliance 2, 17, 18, 19, 20 that is a PC 17, Laptop 19, PDA 20, Wireless LAN 18 or Room-Display 2.

A still further preferred embodiment further comprises a connection between server 1, 21 and Internet-Call-Center 5 that is realized by actuating a help-button 8 of the appliances 2.

A still further preferred embodiment further comprises that, the request to the server 1, 21 is instantaneously realized by wire or without, particularly by remote control.

A still further preferred embodiment further comprises a connection with the Call-Center 5 that is realized by a person and/or by an automatic voice machine.

The communication system according to the invention further comprises a method for improving the benefit of an electrical appliance 2, 17, 18, 19, 20, whereby relevant data of the appliance 2, 17, 18, 19, 20 are made available for the Internet-Call-Center 5 by a server 1, 21, such that a desired status of the appliances 2, 17, 18, 19, 20 can be effected by external activity of the Internet-Call-Center 5.

A preferred embodiment further comprises said method whereby the desired status of the appliance 2, 17, 18, 19, 20 can be realized instantaneously by the Internet-Call-Center 5 interacting with the server 1, 21 and/or the appliance 2, 17, 18, 19, 20.

Another preferred embodiment further comprises said method, whereby the Internet-Call-Center 5 informs the user of the appliances 2, 17, 18, 19, 20 and the user effects the desired status of the appliance 2, 17, 18, 19, 20 based on the present information.

A still other preferred embodiment further comprises said method, whereby the Internet-Call-Center (5) and the user communicates by spoken words, writing and/or pictures.

The present invention is, of course, in no way restricted to the specific disclosure of the specification and drawings, but also encompasses any modifications within the scope of the appended claims.

The invention claimed is:

1. A communication system, comprising:
   at least one or more home electrical appliances; and
   a server, linked to the at least one or more home electrical appliances, whereby relevant data about the at least one or more home electrical appliances are reproduced on the server and made available to the Call-Center by the server via the internet, such that the desired status of the one or more home electrical appliances are effected by external activity of the Call-Center, wherein said data comprises an up to date user manual having information about operating the at least one or more home electrical appliances, and the server is connectable with a Call-Center via the Internet, wherein an owner of the at least one or more home electrical appliances controls access to said data on the server by a Call-Center agent, the Call-Center has access to the data of the one or more home electrical appliances, respectively to the data up to date about the one or more home electrical appliances, exclusively at the moment the user precisely intends, wherein the up to date user manual, a display and an input keyboard of the at least one or more home electrical appliances to be operated is provided by the owner of the one or more home electrical appliances to the Call-Center via the server and the Internet only upon request to the owner by the Call-Center agent for said up to date user manual, display and input keyboard of the one or more home electrical appliances to be operated, wherein connection with the Call-Center is initiated by a person who is the owner of the one or more home electrical appliances and not by an electronic device, and the Call-Center has no more access to the data on the server upon the owner of the one or more home electrical appliances interrupting the connection with the Call-Center.

2. The communication system of claim 1, wherein the server is connected with the Call-Center via the Internet upon request of the user.

3. The communication system of claim 1, wherein a plurality of appliances are assigned to the server.

4. The communication system of claim 3, wherein the appliance is selected from the group consisting of a hi-fi-unit, a home automation appliance, or any combination thereof.

5. The communication system of claim 3, wherein relevant data of the appliances are made available to the Internet-Call-Center by the server.

6. The communication system of claim 1, wherein the server is provided as a black-box-server as an open platform.

7. The communication system of claim 1, wherein the connection between the server and Internet-Call-Center is realized by actuating a help-button of the appliances.

8. The communication system of claim 1, wherein a request to the server is realized instantaneously by wire or without by remote control.

9. The communication system of claim 7, wherein actuating the help-button calls the Internet-Call-Center without instantaneously causing telephone charges.

10. The communication system of claim 1, wherein the connection with the Call-Center is realized by a person respectively by an automatic voice machine.

* * * * *